(12) United States Patent
Tanabe et al.

(10) Patent No.: US 8,203,537 B2
(45) Date of Patent: Jun. 19, 2012

(54) TACTILE AND VISUAL USER INTERFACE DEVICE AND PERSONAL DIGITAL ASSISTANT

(75) Inventors: Tadashi Tanabe, Kanagawa (JP); Tsutomu Takahashi, Kanagawa (JP); Fumisada Maeda, Tokyo (JP); Akira Suzuki, Kanagawa (JP); Nobuyuki Nagai, Miyagi (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 957 days.

(21) Appl. No.: 12/205,228

(22) Filed: Sep. 5, 2008

(65) Prior Publication Data

US 2009/0066672 A1  Mar. 12, 2009

(30) Foreign Application Priority Data

Sep. 7, 2007  (JP) ................ P2007-233369

(51) Int. Cl.
*G06F 3/041* (2006.01)
(52) U.S. Cl. ........................ 345/173; 345/156
(58) Field of Classification Search ........... 345/173–178
See application file for complete search history.

(56) References Cited

U.S. PATENT DOCUMENTS 6,535,201 B1 * 3/2003 Cooper et al. ............... 345/173
6,897,151 B2   5/2005 Winter et al.
7,352,356 B2 * 4/2008 Roberts et al. .............. 345/173
2009/0002328 A1 * 1/2009 Ullrich et al. ............... 345/173

FOREIGN PATENT DOCUMENTS

| JP | 6 259006    | 9/1994 |
| JP | 10 27053    | 1/1998 |
| JP | 10 134671   | 5/1998 |
| JP | 10 214158   | 8/1998 |
| JP | 10 255106   | 9/1998 |
| JP | 11 15599    | 1/1999 |
| JP | 2000 49913  | 2/2000 |
| JP | 2000 148393 | 5/2000 |
| JP | 2003 91233  | 3/2003 |
| JP | 2004 157933 | 6/2004 |

* cited by examiner

*Primary Examiner* — Bipin Shalwala
*Assistant Examiner* — Ryan A Lubit
(74) *Attorney, Agent, or Firm* — Frommer Lawrence & Haug LLP; William S. Frommer; Paul A. Levy (57) ABSTRACT

A user interface device and a PDA include: a transparent panel unit possessing plural layers, each provided with plural transparent deformation sections deformable to a specified shape by injection or discharge of fluid; a fluid channel unit possessing, in common or separately, two transparent fluid channels to inject and to discharge fluid to and from the deformation sections; a fluid pump unit to discharge or suck fluid to and from the fluid channel unit; a display panel unit provided with the transparent panel unit over an upper surface of the display panel unit and possessing a screen surface to display an image; and a controller to control injection and discharge of the fluid to and from the deformation sections of the transparent panel unit, corresponding to an image to be displayed on the screen of the display panel unit. Information can be conveyed tactilely and visually to a user.

6 Claims, 6 Drawing Sheets

TACTILE AND VISUAL USER INTERFACE DEVICE AND PERSONAL DIGITAL ASSISTANT

CROSS REFERENCES TO RELATED APPLICATIONS

The present invention contains subject matter related to Japanese Patent application JP 2007-233369 filed in the Japanese Patent Office on Sep. 7, 2007 and the entire contents of which being incorporated herein by reference.

BACKGROUND OF THE INVENTION (1) Field of the Invention

The present invention relates to a user interface device and a personal digital assistant (PDA) which can convey information to a user according to a tactile and visual mode.

(2) Description of the Related Art

In the past, for example, an information display/input device, in which a so-called touch panel is arranged on a display of a liquid crystal panel, displays an image of a virtual key on a display screen and makes it possible to input or select the information allocated to the virtual key, by a user touching the top of the touch panel area corresponding to the display position of the virtual key with a fingertip or a nib of a stylus pen, etc.

Document 1 (JP-2004-157933 A, FIG. 1 and FIG. 9) discloses a concavo-convex formation device which includes: plural displacement elements possessing a displacement unit arranged on a transparent substrate, and a displacement power generator operable to displace the displacement unit in a separating direction from the substrate correspondingly to a control signal; a transparent film layer provided in the vicinity of these displacement elements and operable to deform a contact portion to convex when the displacement unit receives a displacement power at the contact portion concerned; and a control means operable to output a control signal to each of the displacement elements individually. In the concavo-convex formation device, a transparent substrate and a film layer are laminated with a display device to form structure of a panel, over the surface of which a touch detection means is provided to detect contact. In Document 1, a user is informed of an appointed display position (for example, a virtual key position) to be touched at the time of a touch panel operation, by displacing to a shape of convex the transparent film layer of the concavo-convex formation device.

SUMMARY OF THE INVENTION

As mentioned above, by employing the constitution which arranges a concavo-convex formation device and a touch panel on a panel surface of a display device, and enabling formation of a concavo-convex shape on the panel surface concerned, not only the communication of information in a visual mode by the displayed content on a screen but also the communication of information in a tactile mode by formation of the concavo-convex shape becomes possible to a user.

However, in such constitution as described in Document 1, the concavo-convex shape formed in a certain position on the panel surface turns typically into the same concavo-convex shape. Namely, the concavo-convex shape which can be formed in a certain position of the panel surface depends on the shape of the displacement element arranged to the position. Consequently, it is difficult to form a concavo-convex shape at a certain time for example, and to form another different concavo-convex shape at another time. In other words, in the constitution disclosed by Document 1, the information which is conveyed by a visual mode to a user by changing the displayed content on the screen can be changed; however, the information which is conveyed by a tactile mode to a user can not be changed, since the concavo-convex shape turns always into the same shape.

On the other hand, if the information which is conveyed by a tactile mode can be changed linking to the change of the displayed content concerned (namely, if a concavo-convex shape can be changed), at the same time as the information conveyed by a visual mode is changed by changing the displayed content, a user interface which is more diverse and faithful to a user will be realized.

The present invention is made in view of the above circumstances and provides a user interface device and a personal digital assistant which enable change of the information conveyed by a tactile mode as well as change of the information conveyed by a visual mode, by employing the constitution which can convey information by a tactile and visual mode to a user.

The user interface device and personal digital assistant of an embodiment of the present invention solves the subject mentioned above by including: a transparent panel unit including plural layers, each of the layers being provided with plural transparent deformation sections operable to be deformed to a specified shape by injection of fluid or discharge of fluid; a fluid channel unit possessing structure forming a first channel and a second channel in common or separately, the first channel being a transparent fluid channel operable to supply fluid to be injected to the deformation sections and the second channel being a transparent fluid channel operable to pass fluid discharged from the deformation sections; a fluid pump unit operable to perform discharge of fluid at least to the fluid channel unit or suction of fluid at least from the fluid channel unit; a display panel unit including the transparent panel unit provided over an upper surface of the display panel unit and a screen surface operable to display at least an image; and a controller operable to control injection of the fluid to the deformation sections of the transparent panel unit or discharge of the fluid from the deformation sections of the transparent panel unit, according to an image to be displayed on the screen surface of the display panel unit.

That is, according to the present invention, in the transparent panel including plural layers each of which is provided with plural transparent deformation sections deformable into a specified shape by injection or discharge of fluid, a shape formed on the transparent panel unit can be changed into various shapes by deforming the respective deformation section of each layer.

In the present invention, providing a transparent panel in which plural transparent deformation sections deformable into a specified shape by injection or discharge of fluid are arranged in each of plural layers, it becomes possible to change the information which is conveyed in a tactile mode as well as the information which is conveyed in a visual mode, by deforming each of the deformation sections of each layer to a specified shape.

BRIEF DESCRIPTION OF THE DRAWINGS

Embodiments of the present invention will be described in detail based on the following figures, wherein.

DETAILED DESCRIPTION OF PREFERRED EMBODIMENTS

Hereinafter with reference to the accompanying drawings, the embodiments of the present invention are explained in detail.

In the following embodiments, a mobile-phone terminal is explained as an example of application of a user interface device and a personal digital assistant of the present invention. It is needless to say, however, that the contents explained here are of course a mere example, and that the present invention is not limited to the example.

[Basic Constitution]

Figure 1:
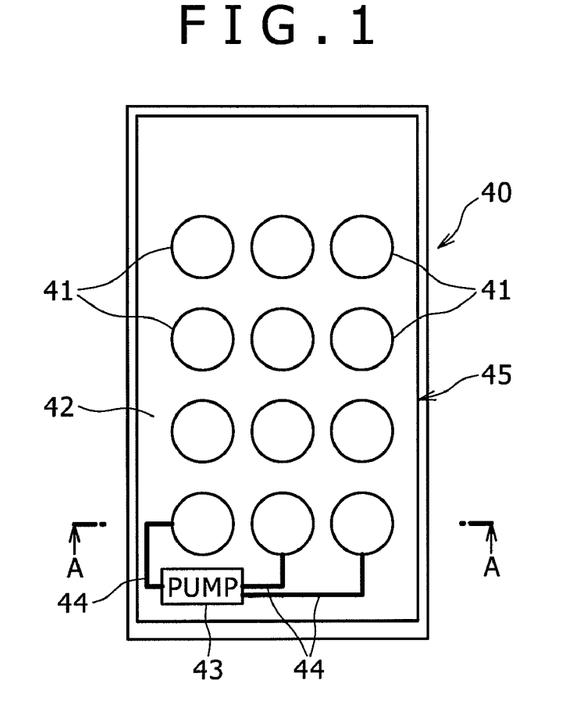
FIG. 1 is a front view illustrating a mobile-phone terminal provided with a tactile-visual UI panel of basic constitution employed in an embodiment of the present invention, seen from a screen surface side of a display panel.
Figure 2:
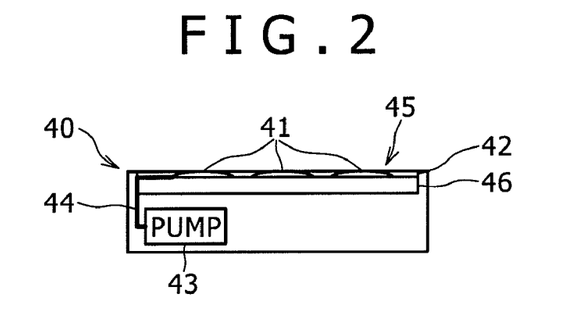
FIG. 2 is a view illustrating the state before a deformation section of the tactile-visual UI panel of the basic constitution illustrated in FIG. 1 is deformed to a convex shape.
Figure 3:
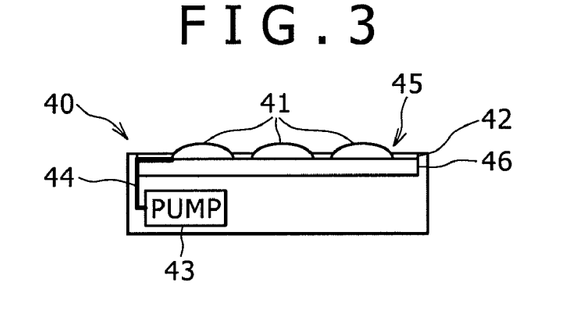
FIG. 3 is a view illustrating the state after a deformation section of the tactile-visual UI panel of the basic constitution illustrated in FIG. 1 is deformed to a convex shape.

FIGS. 1-3 illustrate conceptual diagrams of the basic constitution of a tactile-visual UI (User Interface) panel 45 provided in a mobile-phone terminal 40 according to an embodiment of the present invention. FIG. 1 illustrates a view of the mobile-phone terminal 40 according to the present embodiment, seen from a screen surface side (front side) of a display panel. FIGS. 2 and 3 illustrate a cross-section structure overview of the mobile-phone terminal 40, cut along a dash-dotted line and seen from the side indicated by arrows A-A in FIG. 1. FIG. 2 illustrates roughly the state before a deformation section 41 of the tactile-visual UI panel 45 is deformed to a convex shape. FIG. 3 illustrates roughly the state after the deformation section 41 of the tactile-visual UI panel 45 is deformed to a convex shape.

The tactile-visual UI panel 45 possesses a transparent sheet 42, plural deformation sections 41, a pump 43, and a fluid channel 44 at least.

The transparent sheet 42 is formed by transparent elastomeric material etc. possessing elasticity. The transparent sheet 42 is provided in the front (the upper, screen surface side) of a display panel 46 of the mobile-phone terminal 40, and is arranged so that the transparent sheet 42 may cover almost the whole surface of the screen surface of the display panel 46 concerned. In the case of the mobile-phone terminal of the present embodiment, a transparent touch panel (not shown) is provided in the front side (the upper surface side) of the transparent sheet 42. The transparent touch panel possesses elasticity same as the transparent sheet 42 concerned, and is arranged so that the transparent touch panel may cover almost the whole surface of the transparent sheet 42. The transparent touch panel in the present embodiment employs a panel constituted by the existing technology in which, for example, when a user touches the surface of the panel with a fingertip, the nib of a stylus pen, etc., the contact concerned is detected and the detection signal is outputted. Therefore, the illustration and detailed explanation of the transparent touch panel are omitted here.

The fluid channel 44 is formed by a tube-like transparent member, for example, through which fluid (for example, a liquid, a gas, a gelatinous material, etc.) is movable. One end of the tube of each fluid channel 44 is connected with a fluid discharge suction orifice of the pump 43, and the other end of the tube is connected with each deformation section 41. It is desirable that the fluid channel 44 concerned is formed by material which possesses flexibility of a certain degree in the longitudinal direction and in the direction orthogonal to the longitudinal direction of the tube, but does not change at least with respect to the diameter (namely, it does not expand nor contract in the diameter direction). FIGS. 1-3 illustrate only some fluid channels 44, in order to simplify illustration, but the actual fluid channel 44 is arranged so that the fluid channel 44 may connect between the pump 43 and all the deformation sections 41. In addition, the cross-section of the fluid channel 44 cut in the direction orthogonal to the longitudinal direction of the fluid channel 44 is not limited to a shape of annulus.

The pump 43 is operable to perform the discharge and suction of fluid. A so-called diaphragm micro pump is employed as an example in the present embodiment.

Each of the plural deformation sections 41 is formed by a transparent elastomeric material and possesses a predetermined shape (a circular shape in the example of FIG. 1). The injection and discharge of fluid (a liquid, a gas, a gelatinous material, etc.) are possible to and from the interior of the circular section concerned of the transparent elastomeric material. When the fluid is injected into the interior of the circular section, the transparent elastomeric material is possible to expand in the thickness direction of the transparent sheet 42. On the other hand, when the fluid is discharged from the interior of the circular section, the transparent elastomeric material is possible to contract in the thickness direction of the transparent sheet 42. The circular section of each of the deformation sections 41 is connected with the fluid discharge suction orifice of the pump 43 through the fluid channel 44. Consequently, when the fluid (a liquid, a gas, a gelatinous material, etc.) is discharged from the pump 43, the fluid will be injected into the circular section of the deformation section 41 through the fluid channel 44, and the circular section concerned will expand in the thickness direction of the transparent sheet 42. On the other hand, when the pump 43 sucks the fluid through the fluid channel 44, the fluid is discharged from the interior of the circular section of the deformation section 41, and the circular section concerned will contract to almost the same thickness of the transparent sheet 42. However, in the case of the mobile-phone terminal of the present embodiment, the tactile-visual UI panel 45 is provided over the screen surface of the display panel 46, as mentioned above, and the screen surface of the display panel 46 concerned possesses the hardness of a certain degree, and is not deformed by an external force to some extent. Accordingly, when the fluid is injected into the deformation section 41 to expand the circular section, the expansion direction will be on the opposite side of the screen surface of the display panel 46 (namely, on the touch panel side), as illustrated in FIG. 3. In the case where the tactile-visual UI panel 45 is provided over the display panel 46 possessing the size of about 1.5-3 inches, similar to the size of a display panel which is provided to a small portable information terminal such as the mobile-phone terminal of the present embodiment, and where the fluid is injected to the deformation section 41 in the panel 45 to form a circular-convex shape, it is possible to make the diameter of the circular section of the deformation section 41 concerned be 3-8 mm as an example, the height of the expanded convex shape (the amount of convex at the time of projecting from the surface of the transparent sheet 42) be about 1 mm as an example, and the hardness (softness) of the circular portion of the expanded convex shape be about 60 degrees in rubber hardness as an example. According to the present embodiment, when a button or a key for example is formed by expanding the deformation section 41 of the tactile-visual UI pane 45, it is also possible to adjust the contained fluid pressure of the deformation section, by adjusting the fluid discharge amount or fluid suction amount of the pump 43.

The transparent sheet 42, each of the deformation sections 41, and the fluid channel 44 may be formed by the same member. That is, for example, the transparent sheet 42 may be formed by stacking and gluing two transparent elastomeric sheets, and when stacking and gluing these two sheets together, the portion of each of the deformation sections 41 and the portion of each of the fluid channels 44 are not glued. By the method, when the fluid is discharged from the pump 43, the fluid will pass along the fluid channel 44 formed by the unglued part of the two sheets, and will be injected into the circular section of the deformation section 41 similarly formed by the unglued part of the two sheets. As the result, the circular section concerned will expand. On the other hand, when the pump 43 sucks the fluid, the circular section will contract because the fluid discharged from the interior of the circular section of the deformation section 41 returns to the pump 43 through the fluid channel 44. In the case of this example, if the width of the unglued part which forms the fluid channel 44 (namely, it corresponds to the diameter of the fluid channel) is small enough compared with the thickness of the transparent sheet 42, the expansion and contraction of the fluid channel 44 concerned in the diameter direction by the fluid can be ignored.

In FIGS. 1-3, an example is explained for a case where the expansion and contraction are performed for all the deformation sections 41 at the same time by the discharge and suction of fluid with the pump 43. Alternatively, however, for example, a micro valve (not shown) may be provided in a fluid injection part of each of the deformation sections 41, and open/close of each micro valve may be controlled separately, thereby enabling the injection and discharge of fluid to and from each of the deformation sections 41. By this scheme, it becomes possible to perform expansion and contraction for the desired deformation section 41 only.

As mentioned above, according to the basic constitution of the tactile-visual UI panel 45 in the mobile-phone terminal of the present embodiment illustrated in FIGS. 1-3, by controlling the discharge and suction of fluid with the pump 43, and controlling the injection and discharge of the fluid to and from each of the deformation sections 41, it becomes possible to form a convex shape in the front side of the display panel 46 if needed, or conversely to purge the convex shape to return to an almost flat surface.

In the mobile-phone terminal of the present embodiment, if an image of a virtual key is displayed on a display screen so as to correspond to the place where the deformation section 41 is arranged over the tactile-visual UI panel 45, and at the same time, if the fluid is injected to the deformation section 41 of the tactile-visual UI panel 45 to deform the deformation section 41 to a convex shape, the virtual key on the display screen will actually appear visually as a key of a convex shape to a user, and the user will be able to recognize the deformation section 41 of the convex shape as an actual key, tactilely as well as visually, by touching the deformation section 41 with a finger etc.

Since the touch panel is provided over the surface of the tactile-visual UI panel 45 in the mobile-phone terminal of the present embodiment as mentioned above, when a user touches the convex-shaped face of the touch panel of the deformation section 41 with a finger etc., the fact that the user has touched the position, i.e., the display position of the virtual key, can be recognized with the use of a touch detection signal from the touch panel concerned. Accordingly, the user is allowed to input or select information currently assigned to the virtual key concerned.

Explanation of the constitution for performing the discharge and suction control of the pump 43, the open/close control of the micro valve, and process of information inputting and selection, etc. based on a touch detection signal of the touch panel will be described later.

[Constitution for Realizing a Tactile and Visual Shape Change]

In the case of the basic constitution described above with reference to FIGS. 1-3, the information which the mobile-phone terminal of the present embodiment can convey to a user is visual information by the image displayed on the display screen, and tactile and visual information by the deformation of the deformation section 41 of the tactile-visual UI panel 45. Among the information which the mobile-phone terminal of the present embodiment can convey to a user, the visual information by the display image on the display screen is freely changeable by changing the display image concerned into what is desired. However, the tactile and visual information by the tactile-visual UI panel 45 does not necessarily has much flexibility in changing the information, since only two kinds of information are available: one for when the deformation section 41 is expanded and deformed to a convex shape, and the other for when the deformation section 41 is shrunk and made almost flat.

Figure 4:
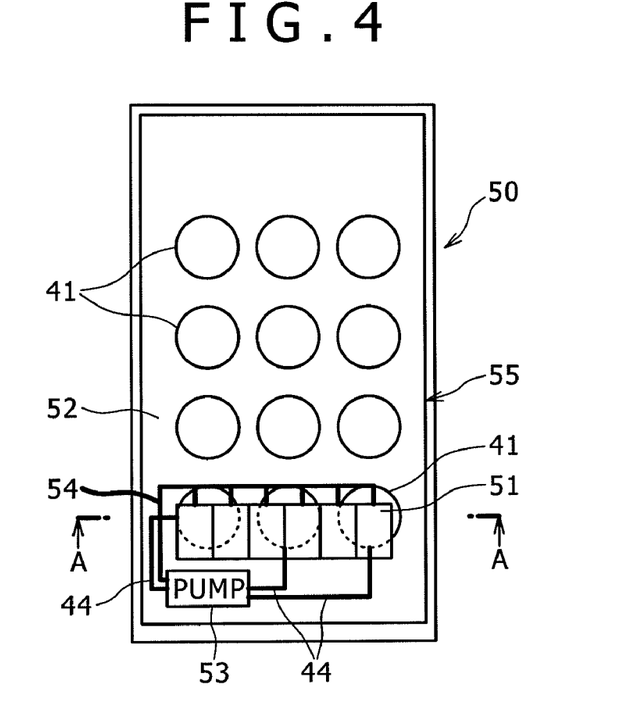
FIG. 4 is a front view illustrating a mobile-phone terminal provided with a tactile-visual UI panel which can change information conveyed tactilely and visually to a user, seen from a screen surface side of a display panel.
Figure 5:
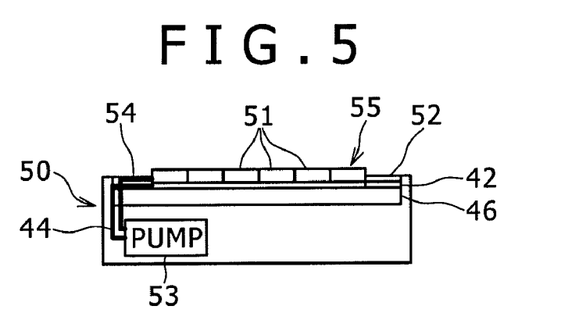
FIG. 5 is a view illustrating the state after a deformation section of a second layer of the tactile-visual UI panel illustrated in FIG. 4 is deformed to a convex shape.
Figure 6:
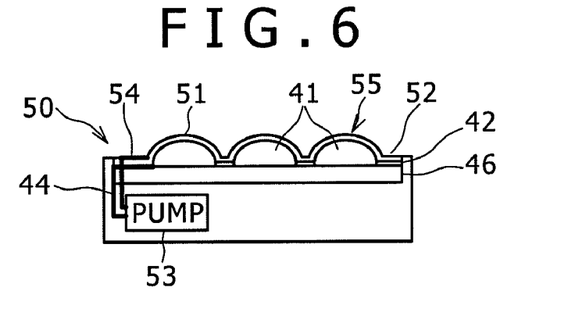
FIG. 6 is a view illustrating the state after a deformation section of a first layer of the tactile-visual UI panel illustrated in FIG. 4 is deformed to a convex shape.

FIGS. 4-6 are a conceptual diagram illustrating a tactile-visual UI panel 55 which realizes more flexibility in changing the information which can be conveyed tactilely and visually to a user in a mobile-phone terminal 50 according to an embodiment of the present invention. FIG. 4 illustrates the view that the mobile-phone terminal 50 of the present embodiment is seen from the screen surface side (front side) of the display panel. FIGS. 5 and 6 illustrate a cross-section structure overview of the mobile-phone terminal 50, cut along a dash-dotted line and seen from the side indicated by arrows A-A in FIG. 4. FIG. 5 illustrates the state after a deformation section 51 of a second layer of the tactile-visual UI panel 55 is deformed to a convex shape. FIG. 6 illustrates roughly the state after the deformation section 41 of the tactile-visual UI panel 55 is deformed to a convex shape.

In the mobile-phone terminal 50 according to an embodiment of the present invention, the tactile-visual UI panel 55 possesses at least two panel devices, the first layer and the second layer, and a pump 53.

The panel device of the first layer possesses the almost same components as the transparent sheet 42, the plural deformation sections 41, and the fluid channel 44 of the tactile-visual UI panel 45 explained above with reference to FIGS. 1-3. The transparent sheet 42, the deformation sections 41, and the fluid channel 44 which are included in the first layer concerned are almost the same as what have been explained with reference to FIGS. 1-3; therefore, the same symbols and numerals as in FIGS. 1-3 are attached to the components, and the detailed explanation thereof is omitted.

In the tactile-visual UI panel 55 of the present embodiment, a panel device of the second layer is arranged over the front face of the transparent sheet 42 included in the first layer, and a touch panel (not shown) is arranged over the front face of the second layer concerned.

That is, in the tactile-visual UI panel 55 of the present embodiment, the second layer possesses a transparent sheet 52, plural deformation sections 51, and a fluid channel 54 at least.

Similarly to the transparent sheet 42 of the first layer, the transparent sheet 52 of the second layer concerned is formed by transparent elastomeric material etc. possessing elasticity. The transparent sheet 52 is provided in the front side (the screen surface side) of the display panel 46 of the mobile-phone terminal 50 and in the front side of the panel device of the first layer, and is arranged so that the transparent sheet 52 may cover almost the whole surface of the screen surface of the display panel 46 concerned. In the case of the mobile-phone terminal of the present embodiment, a not-shown transparent touch panel, which is the same as described above, is arranged over the front side of the transparent sheet 52 of the second layer so that almost the whole surface of the transparent sheet 52 concerned may be covered.

Similarly to the fluid channel 44 of the first layer, the fluid channel 54 of the second layer is formed, for example, by a tube-like transparent member through which fluid (for example, a liquid, a gas, a gelatinous material, etc.) is movable. One end of the tube of each fluid channel 54 of the second layer is connected with a fluid discharge suction orifice of the pump 53, and the other end of the tube is connected with each deformation section 51. Similarly to the fluid channel 44 of the first layer, it is desirable that the fluid channel 54 of the second layer concerned is formed by material which possesses flexibility of a certain degree in the longitudinal direction and in the direction orthogonal to the longitudinal direction of the tube, but does not change at least with respect to the diameter (namely, it does not expand nor contract in the diameter direction). In FIGS. 4-6, only some fluid channels 44 of the first layer and only some fluid channels 54 of the second layer are shown for the simplicity of illustration. However, the actual fluid channel 44 of the first layer is arranged so that the fluid channel 44 may connect between the pump 53 and all the deformation sections 41 of the first layer. Similarly, the actual fluid channel 54 of the second layer is arranged so that the fluid channel 54 may connect between the pump 53 and all the deformation sections 51 of the second layer.

The pump 53 of the tactile-visual UI panel 55 of the present embodiment is, similarly to the pump 43, operable to perform the discharge and suction of fluid and employs a so-called diaphragm micro pump, as an example. However, in the example of FIGS. 4-6, the pump 53 is operable to perform the discharge and suction of fluid separately in the fluid channel 44 of the first layer and the fluid channel 54 of the second layer.

Each of the plural deformation sections 51 of the second layer is formed by a transparent elastomeric material and possesses predetermined shape (a square shape in the example of FIG. 4). The injection and discharge of fluid (a liquid, a gas, a gelatinous material, etc.) are possible to and from the interior of the square shape section concerned of the transparent elastomeric material. When the fluid is injected into the interior of the square shape section, the transparent elastomeric material expands in the thickness direction of the transparent sheet 52 of the second layer concerned. On the other hand, when a fluid is discharged from the interior of the square shape section, the transparent elastomeric material contracts in the thickness direction of the transparent sheet 52. The square shape section of each of the deformation sections 51 of the second layer concerned is connected with the fluid discharge suction orifice of the pump 53 through the fluid channel 54 of the second layer. Consequently, when the fluid (a liquid, a gas, a gelatinous material, etc.) is discharged from the pump 53 to the fluid channel 54 of the second layer concerned, the fluid will be injected into the square shape section of each of the deformation sections 51, and the square shape section concerned will expand in the thickness direction of the transparent sheet 52 of the second layer. On the other hand, when the pump 53 sucks the fluid through the fluid channel 54 of the second layer, the fluid will be discharged from the interior of the square shape section of each of the deformation sections 51 of the second layer concerned, and the square shape section concerned will contract to the almost same thickness as the thickness of the transparent sheet 52 of the second layer.

In the case of the mobile-phone terminal of the present embodiment, the tactile-visual UI panel 55 possesses the first-layer panel device and the second-layer panel device which are provided over the screen surface of the display panel 46. The first-layer panel device is arranged over the surface of the display panel 46 possessing the hardness of a certain degree as described above, and the second-layer panel device is arranged over the front side of the first layer. Accordingly, when the fluid is injected only into the deformation section 41 of the first layer, for example, and the circular section of the deformation section 41 concerned expands, the tactile-visual UI panel 55 concerned will be in the state where the circular section of the deformation section 41 is deformed to a convex shape in the opposite side to the screen surface of the display panel 46 (namely, to the second layer side), as shown in FIG. 6, while the deformation section 51 of the second layer is deformed along with the convex shape of the deformation section 41 of the first layer. When the fluid was injected only into the deformation section 51 of the second layer, for example, and the square shape section of the deformation section 51 concerned expands, the tactile-visual UI panel 55 concerned will be in the state where the square shape section of the deformation section 51 is deformed to a convex shape in the opposite side to the screen surface of the display panel 46 (namely, to the touch panel side), as shown in FIG. 5, while, the deformation section 41 of the first layer remains in the state where the square shape section keeps an almost flat shape along the display panel 46. In the case of a small portable information terminal such as the mobile-phone terminal of the present embodiment, similarly to the example of FIGS. 1-3 described above, the square shape section of the deformation section 45 of the second layer is designed to possess, for example, a shape of square of 3-8 mm on a side, a height of about 1 mm in a convex shape when expanded (the amount of convex at the time of projecting from the surface of the transparent sheet 52), and a rubber hardness of about 60 degrees for the hardness (softness) of the square shape section concerned. Also in the present embodiment, similarly to the above-mentioned example, when the deformation sections 41 and 51 of the tactile-visual UI panel 55 are expanded to form, for example, a button and a key, it is also possible to adjust the contained fluid pressure of the deformation sections by adjusting the fluid discharge amount or fluid suction amount of the pump 53.

Also in the example of FIGS. 4-6, similarly to the above-mentioned example, the transparent sheet 42 and the deformation section 41 and the fluid channel 44 of the first layer may be formed by the same member, and the transparent sheet 52 and the deformation section 51 and the fluid channel 54 of the second layer may also be formed by the same member. Only the second layer is explained hereinafter. For example, the transparent sheet 52 of the second layer is formed by stacking and gluing two transparent elastomeric sheets, and when stacking and gluing these two sheets together, the portion of each of the deformation sections 51 and the portion of each of the fluid channels 54 are not glued. By the method, when the fluid is discharged from the pump 53, the fluid will pass along the fluid channel 54 formed by the unglued part of the two sheets, and will be injected into the square shape section of the deformation section 51 similarly formed by the unglued part of the two sheets. As the result, the square shape section concerned will expand. On the other hand, when the pump 53 sucks the fluid, the square shape section will contract because the fluid discharged from the interior of the square shape section of the deformation section 51 returns to the pump 53 through the fluid channel 54. Furthermore, in the case of this example, similarly to the above-mentioned example, if the width of the unglued part which forms the fluid channel 54 (namely, it corresponds to the diameter of the fluid channel) is small enough compared with the thickness of the transparent sheet 52, the expansion and contraction of the fluid channel 54 concerned in the diameter direction by the fluid can be ignored.

In FIGS. 4-6, the example is explained in which, by the discharge and suction of fluid with the pump 53, the expansion and contraction of all the deformation sections 41 of the first layer is performed at the same time, or the expansion and contraction of all the deformation sections 51 of the second layer is performed at the same time. However, if a micro valve (not shown) is provided, for example, in the fluid injection and discharge portion of each of the deformation sections 41 of the first layer, as described above, and in addition, if a micro valve (not shown) is provided also in the fluid injection and discharge portion of each of the deformation sections 51 of the second layer, and if the injection and discharge of the fluid to and from each of the deformation sections 41 and 51 of the first and second layer is made controllable, with the control of individual open/close of each micro valve provided for each layer, it becomes possible to expand and shrink only the desired deformation section 41 of the first layer or only the desired deformation section 51 of the second layer.

As mentioned above, according to the basic constitution of the tactile-visual UI panel 55 in the mobile-phone terminal of the present embodiment as shown in FIGS. 4-6, by controlling the discharge and suction of the fluid with the pump 53, and controlling the injection and discharge of the fluid to and from each of the deformation sections 41 and 51 of the first and second layer, it is possible, as desired, to form a circular convex shape by each deformation section 41 of the first layer in the front of the display panel 46 and to form a square convex shape by each deformation section 51 of the second layer. Conversely, it is also possible to abolish the circular convex shape and the square convex shape to return the first and the second layer to an almost flat surface.

In the mobile-phone terminal of the present embodiment, for example, when an image of a circular virtual key is displayed on a display screen so as to correspond to the place where each of the deformation sections 41 of the first layer of the tactile-visual UI panel 55 is arranged, and at the same time, the fluid is injected to each of the deformation sections 41 of the first layer to deform each of the deformation sections 41 to a convex shape, the circular virtual key on the display screen will actually appear visually as a key of a convex shape to a user, and the user will be able to recognize the deformation sections 41 of the convex shape as actual keys, tactilely as well as visually, by touching the deformation sections 41 with a finger etc. Furthermore, for example, when an image of a square virtual key is displayed on a display screen so as to correspond to the place where each of the deformation sections 51 of the second layer of the tactile-visual UI panel 55 is arranged, and at the same time, the fluid is injected to each of the deformation sections 51 of the second layer to deform each of the deformation sections 51 to a convex shape, the square virtual key on the display screen will actually appear visually as a key of a square convex shape to a user, and the user will be able to recognize the deformation sections 51 of the square convex shape as actual keys, tactilely as well as visually, by touching the deformation sections 51 with a finger etc.

Namely, according to the present embodiment, by the tactile-visual UI panel 55, the information which can be conveyed to a user tactilely and visually will be three kinds: the first one for when each deformation section 41 of the first layer is expanded and deformed to a circular convex shape, the second one for when each deformation section 51 of the second layer is expanded and deformed to a square convex shape, and the third one for when both of the deformation section 41 of the first layer and the deformation section 51 of the second layer are shrunk and made almost flat. Therefore, the flexibility in changing the tactile and visual information by the tactile-visual UI panel 55 concerned is increased. Of course, when each of the deformation section 41 of the first layer and the deformation section 51 of the second layer are expanded at the same time to form a circular convex shape and a square convex shape, the combination of the circular convex shape and the square convex shape becomes available, leading to further increased flexibility.

Since the touch panel is provided over the surface of the tactile-visual UI panel 55 which possesses the first layer and the second layer, in the mobile-phone terminal of the present embodiment shown in FIGS. 4-6, as described above, when a user touches the touch panel face over the deformation section 41 concerned with a finger etc., in the state where the deformation section 41 of the first layer is deformed to a convex shape for example, it is possible for the mobile-phone terminal 50 to recognize that the user has touched the position, i.e., the display position of the circular virtual key, with the use of a touch detection signal from the touch panel concerned. Accordingly, the user is allowed to input or select information currently assigned to the circular virtual key concerned. In addition, for example, when a user touches the touch panel face over the deformation section 51 concerned with a finger etc., in the state where the deformation section 51 of the second layer is deformed to a convex shape, it is possible for the mobile-phone terminal 50 to recognize that the user has touched the position, i.e., the display position of the square virtual key, with the use of a touch detection signal from the touch panel concerned. Accordingly, the user is allowed to input or select information currently assigned to the square virtual key concerned.

Explanation of the constitution for performing the discharge and suction control of the pump 53, the open/close control of the micro valve, and information inputting or selection process, etc. based on a touch detection signal of the touch panel will be described later.

Although the number of layers is set to only two layers, the first layer and the second layer, in the example of FIGS. 4-6, the number of layers is not limited to two, but alternative constitution may be employed in which more layers are superposed over the two layers and plural deformation sections of respectively different shapes are provided in the superposed layers, with the individually-performed deformation control of the deformation sections.

Although the convex shape formed by injecting the fluid into a deformation section is described in the examples of FIGS. 1-3 and FIGS. 4-6, the specified shape of the present invention also includes various shapes other than what have been illustrated as a shape when the fluid is injected into the deformation section, such as a shape which swells on the whole with a dented central part (for example, a shape with the circumference swelling to a ring shape), and a shape which swells only in a certain place higher than others.

Other Examples of Basic Constitution

Since the deformation section 41 of the tactile-visual UI panel 45 is assumed to possess a predetermined shape (a circular shape) in the basic constitution shown in FIGS. 1-3, the information which can be conveyed by the deformation section 41 of the tactile-visual UI panel 45 to a user is the tactile and visual information given by the circular convex shape produced when the deformation section 41 is expanded. Similarly, in the constitution shown in FIGS. 4-6, the information which can be conveyed to a user when only the deformation section 51 of the second layer is expanded is the tactile and visual information given by the square convex shape produced when the deformation section 51 concerned is expanded.

Figure 7:
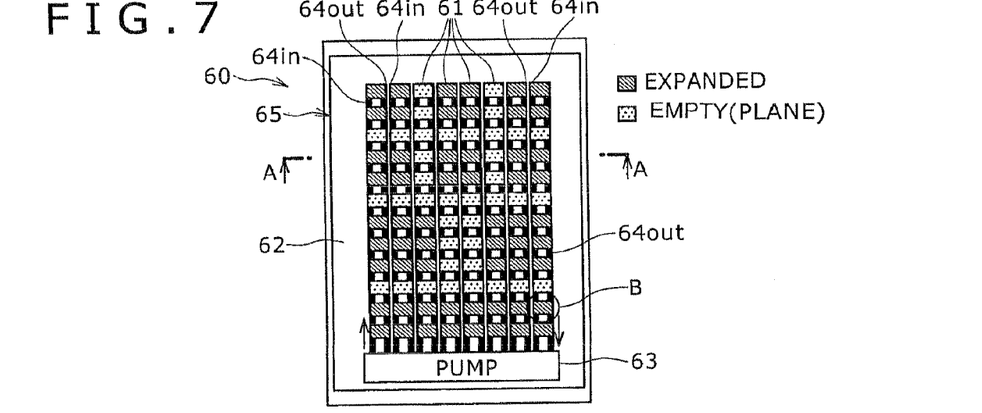
FIG. 7 is a front view illustrating a mobile-phone terminal provided with a tactile-visual UI panel of basic constitution possessing a dot deformation section arranged in matrix, seen from a screen surface side of a display panel.
Figure 8:
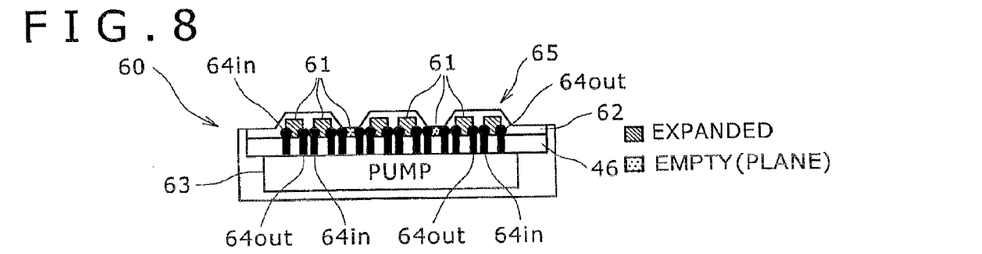
FIG. 8 is a view illustrating the state after some dot deformation sections of the tactile-visual UI panel of the basic constitution illustrated in FIG. 7 are deformed to a convex shape.
Figure 9:
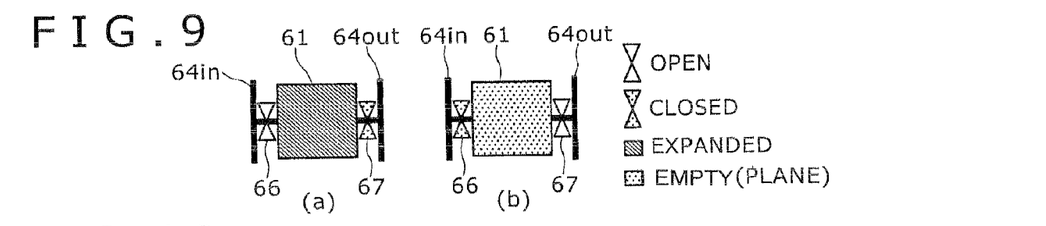
FIG. 9 is an enlarged conceptual diagram illustrating a portion enclosed by a circle B of FIG. 7.

FIGS. 7-9 illustrate conceptual diagrams of a tactile-visual UI panel 65 in a mobile-phone terminal 60 according to an embodiment of the present invention. The tactile-visual UI panel 65 according to the present embodiment can form not only a circular shape or a square shape but also another desired shape, and can convey the tactile and visual information using the desired shape. FIG. 7 is a front view illustrating the mobile-phone terminal 60 of the present embodiment seen from the screen surface side (the front side) of a display panel. FIG. 7 illustrates a cross-section structure overview of the mobile-phone terminal 60 in FIG. 7, cut along a dash-dotted line and seen from the side indicated by arrows A-A in FIG. 7, where some of deformation sections 61 of the tactile-visual UI panel 65 are expanded to the convex shape in order to form the desired shape. FIG. 9 shows an enlarged conceptual diagram illustrating a portion encircled by a circle B of FIG. 7.

In the mobile-phone terminal 60 of the present embodiment shown in FIGS. 7-9, the tactile-visual UI panel 65 possesses a transparent sheet 62, a dot deformation section 61, a pump 63, and a fluid channel 64. In FIG. 7 and FIG. 8, for the simplicity of illustration, a part of the entire, many pieces of dot deformation sections 61 and a part of the entire, many pieces of fluid channels 64 are shown.

Similarly to each of the above-described examples, the transparent sheet 62 is formed by transparent elastomeric material etc. possessing elasticity. The transparent sheet 62 is provided in the front side (the screen surface side) of a display panel 46 of the mobile-phone terminal 60, and is arranged so that the transparent sheet 62 may cover almost the whole surface of the screen surface of the display panel 46 concerned. Also in the present embodiment similarly to each of the above-described examples, a transparent touch panel (not shown) is provided in the front side of the transparent sheet 62.

For example, the dot deformation section 61 according to the present embodiment is arranged in matrix, each dot deformation section 61 respectively possesses a predetermined shape (in the example of FIG. 1, the predetermined shape is a square shape, however the predetermined shape may be of another shape, such as a round shape). The injection of fluid (a liquid, a gas, a gelatinous material, etc.) is enabled to the inside of the square shape section concerned via a fluid injection orifice (not shown), and the discharge of fluid is enabled from the inside of the square shape section concerned via a fluid discharge orifice (not shown).

The fluid channel 64 is formed by a tube-like transparent member through which fluid (a liquid, a gas, a gelatinous material, etc.) is movable. In the present embodiment, the fluid channel 64 is classified into plural fluid supply channels 64*in* for supplying each dot deformation section 61 with the fluid discharged by the pump 63, and plural fluid suction channel 64*out* for returning the fluid discharged from each dot deformation section 61 to the pump 63. Furthermore, in the present embodiment, the fluid supply channel 64*in* is arranged for example, one for every column of the dot deformation section 61 in the matrix arrangement. Similarly, the fluid suction channel 64*out* is also arranged one for every column of the dot deformation section 61 in the matrix arrangement. One piece of the fluid supply channel 64*in* arranged per one column of the matrix arrangement possesses plural bifurcating channels which branches to one for every row in the column concerned. Similarly, one piece of the fluid suction channel 64*out* arranged per one column of the matrix arrangement also possesses plural bifurcating channels which branches to one for every row in the column concerned. The end of each bifurcating channel of the fluid supply channel 64*in* arranged per one column of the matrix arrangement is connected correspondingly to the fluid injection orifice of each the dot deformation section 61 provided for every row in the one column concerned. On the other hand, the common end which is opposite to the bifurcating channel side is connected to the fluid discharge orifice of the pump 63. Similarly, the end of each the bifurcating channel of the fluid suction channel 64*out* arranged per one column of the matrix arrangement is connected correspondingly to the fluid discharge orifice of each dot deformation section 61 provided for every row in the one column concerned. On the other hand, the common end which is opposite to the bifurcating channel side is connected to the fluid suction orifice of the pump 63. Similarly to the above case, the fluid channels 64 is formed by the material which possesses the flexibility of a certain degree with respect to the longitudinal direction of the tube or with respect to the direction orthogonal to the longitudinal direction concerned, on the other hand, the material does not change at least with respect to the diameter (the material does not expand nor contract in the diameter direction). In the above explanation, the common end which is opposite to the bifurcating channel side of the plural fluid supply channels 64*in* is connected with the fluid discharge orifice of the pump 63, respectively, and the common end which is opposite to the bifurcating channel side of the plural fluid suction channels 64*out* is connected with the fluid suction orifice of the pump 63, respectively. However, if there is only one fluid discharge orifice of the pump 63 for example, the common end which is opposite to the bifurcating channel side of the plural fluid supply channels 64*in* may be united to one, and may be connected to one fluid discharge orifice of the pump 63 concerned. Similarly, if there is only one fluid suction orifice of the pump 63, the common end which is opposite to the bifurcating channel side of the plural fluid suction channels 64*out* may be united to one, and may be connected to one fluid suction orifice of the pump 63 concerned.

The pump 63 is a diaphragm micro pump, for example, which is operable to discharge and suck the fluid. A fluid discharge orifice of the pump 63 is connected to the fluid supply channel 64*in*, and the fluid suction orifice of the pump 63 is connected to the fluid suction channel 64*out*.

In the present embodiment, as shown in FIG. 9, near the end of each bifurcating channel of the fluid supply channel 64*in*, a micro valve 66 for a fluid injection orifice is provided individually, and similarly, near the end of each bifurcating channel of the fluid suction channel 64*out*, a micro valve 67 for a fluid discharge orifice is provided individually. The micro valve 66 for a fluid injection orifice and the micro valve 67 for a fluid discharge orifice are controllable to open and close, respectively. That is, in the mobile-phone terminal 60 of the present embodiment, for example, when fluid is injected to the dot deformation section 61 to bring the dot deformation section 61 concerned into an expansion state, the micro valve 66 for a fluid injection orifice is controlled to open, and the micro valve 67 for a fluid discharge orifice is controlled to close. In this case, the pump 63 performs the operation of discharging fluid to the fluid supply channel 64*in* for supplying the fluid to the dot deformation section 61. Accordingly, the fluid discharged from the pump 63 is injected to the inside of the dot deformation section 61 concerned, through the fluid supply channel 64*in* and the micro valve 66 for a fluid injection orifice which is controlled to open. On the other hand, when the fluid is discharged from the dot deformation section 61 in an expansion state to bring the dot deformation section 61 concerned into an empty (plane) state, the micro valve 67 for a fluid discharge orifice is controlled to open, and the micro valve 66 for a fluid injection orifice is controlled to close. In this case, the pump 63 performs the operation of sucking fluid to the fluid suction channel 64*out* for sucking the fluid from the dot deformation section 61. Accordingly, the fluid in the dot deformation section 61 is discharged, and the dot deformation section 61 concerned is brought into an empty (plane) state. The constitution for performing the discharge and suction control of the pump 63 and the open/close control of the micro valves 66 and 67 will be explained later.

By performing control to bring one desired dot deformation section 61 into an expansion state and to bring another desired dot deformation section 61 into an empty (plane) state among the dot deformation sections 61 arranged in matrix, the transparent sheet 62 overlying the dot deformation section 61 which are brought into the expansion state is raised in the direction separating from the screen surface of the display panel 46, and, on the other hand, the transparent sheet 62 overlying the other dot deformation section 61 which are brought into the empty (plane) state remains at the low position near the screen surface of the display panel 46.

That is, according to the mobile-phone terminal of the present embodiment, as shown in FIG. 7, for example, by forming a portion of the transparent sheet 62 which is in the expansion state and raised higher than the adjoining dot deformation sections 61, and by forming a portion which is in the empty (plane) state and positioning lower than the adjoining dot deformation sections 61, it becomes possible to form on the display panel 46 various shapes such as a nearly triangular shape, a ring shape, or an arbitrary curving shape, in addition to the above-described circular and square shapes, using the highly-raised portion of the transparent sheet 62 and the low-lying portion of the transparent sheet 62. The fact makes it possible to increase the variation of information which can be conveyed to a user tactilely and visually. Of course, since the touch panel is provided over the surface of the tactile-visual UI panel 65 also in this example as in the above example, inputting, selection, etc. of various kinds of information by a user are attained by a user touching the touch panel face with a finger etc.

Another Example to Realize the Change in a Tactile-Visual Shape by a Dot Deformation Section Arranged in Matrix In the case of the basic constitution using the matrix arrangement of the dot deformation section such as explained in FIGS. 7-9, the height of the transparent sheet 62 from the screen surface of the display panel 46 is controllable in two levels of height, the height when the dot deformation section 61 is in an expansion state, and the height when the dot deformation section 61 is in an empty (plane) state. Paraphrasing the fact, in the case of the basic constitution explained in FIGS. 7-9, for example, the tactile-visual information which can be conveyed to a user by the tactile-visual UI panel 65 with respect to the parallel direction to the screen surface of the display panel 46 can be changed freely by controlling the desired dot deformation section 61 to an expansion state or to an empty (plane) state. On the contrary, the tactile-visual information which can be conveyed to a user by the tactile-visual UI panel 65 with respect to the perpendicular direction to the screen surface of the display panel 46 becomes two kinds of information, in the expansion state and in the empty (plane) state of the dot deformation section 61, i.e., two kinds of information produced by the height control of the transparent sheet 62; therefore, flexibility of changing the information which can be conveyed tactilely and visually is not necessarily high.

Figure 10:
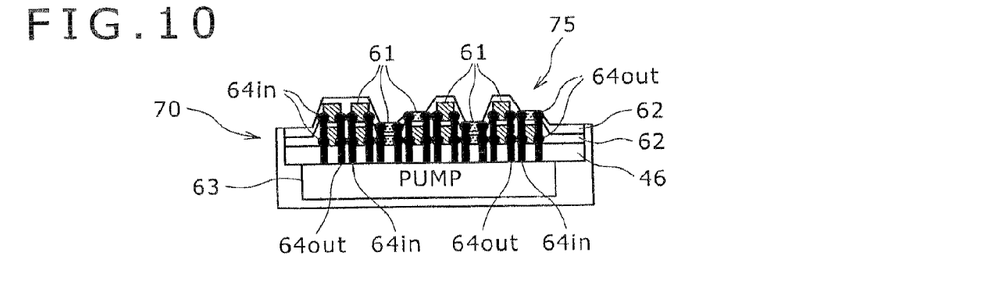
FIG. 10 is a view illustrating the state after some dot deformation sections of a mobile-phone terminal provided with a tactile-visual UI panel are deformed to a convex shape, the dot deformation sections in matrix arrangement being formed in a multi-layer structure.

FIG. 10 shows the conceptual diagram of a tactile-visual UI panel 75 which allows to raise the flexibility in changing the information which can be conveyed to a user tactilely and visually, with respect to the perpendicular direction to the screen surface of a display panel 46 in a mobile-phone terminal 70 according to an embodiment of the present invention.

The tactile-visual UI panel 75 of the mobile-phone terminal 70 shown in FIG. 10 applies the plural-layer structure to the basic constitution explained in FIGS. 7-9, similarly to the example explained with reference to FIGS. 4-6 (two layers of the first and the second layers in the example of FIG. 10). Namely, in the case of the tactile-visual UI panel 75 of the mobile-phone terminal 70 of the present embodiment, a dot deformation section 61 is arranged in matrix for every layer, and a fluid channel 64 and a micro valve which are same as is described above are formed for every layer, and a pump 63 performs the same fluid discharge and suction control for every layer as is described above. Except that the basic constitution of FIG. 7 is changed to possess the layer structure, the tactile-visual UI panel 75 of the mobile-phone terminal 70 of the present embodiment possesses almost same constitution as the example of constitution shown in FIG. 7. Therefore, the front view of the mobile-phone terminal 70 of the present embodiment, seen from the screen surface side (the front side) of a display panel, will be omitted. FIG. 10 illustrates a cross-section structure overview of the mobile-phone terminal 70 of the present embodiment, which possesses layer structure changed from the basic constitution of FIG. 7. The cross-section structure is cut along a dash-dotted line and seen from the side indicated by arrows A-A in FIG. 7, illustrating a state where the desired dot deformation section 61 is deformed to the expansion state and the other dot deformation sections 61 are brought into the empty (plane) state, in the first and the second layer of the tactile-visual UI panel 75. In addition, in FIG. 10, a component which is the almost same component as explained in FIGS. 7-9 is attached with the same symbol and numeral as in FIGS. 7-9, and the detailed explanation thereof is omitted. Although the number of layers is set only to two in the example of FIG. 10 in order to simplify illustration, it is needless to say that the present structure may possess more additional layers overlying the two layers, and each deformation section in each of these additional layers may be controlled to deform individually.

In the mobile-phone terminal 70 according to an embodiment of the present invention, the tactile-visual UI panel 75 possesses at least two panel devices, a first-layer panel device and a second-layer panel device.

The first-layer panel device overlying nearer the display panel 46 possesses the almost same components as the transparent sheet 62, plural dot deformation sections 61 arranged in matrix, plural fluid supply channels 64*in*, and plural fluid suction channels 64*out* of the tactile-visual UI panel 65 explained in FIGS. 7-9.

In the tactile-visual UI panel 75 of the present embodiment, the second-layer panel device is arranged overlying the front of the transparent sheet 62 constituting the first-layer panel device, and a touch panel (not shown) is arranged over the front of the second-layer panel device. In the tactile-visual UI panel 75 of the present embodiment, the second-layer panel device concerned possesses the transparent sheet 62, plural dot deformation sections 61 arranged in matrix, plural fluid supply channels 64*in*, and plural fluid suction channels 64*out*, almost similarly to the first-layer panel device.

The pump 63 of the mobile-phone terminal 70 of the present embodiment is, same as in the example of FIGS. 7-9, a diaphragm micro pump by which the discharge and suction of fluid are enabled. The fluid discharge orifice of the micro pump is connected with a fluid supply channel 64*in* of the first and the second layer, and the fluid suction orifice of the micro pump is connected with a fluid suction channel 64*out* of the first and the second layer. The fluid discharge orifice may be shared in common by the first and the second layer, or alternatively it may be separately provided for each of the first and the second layer. Similarly, the fluid suction orifice may be shared in common by the first and the second layer, or alternatively it may be separately provided for each of the first and the second layer.

Also in the example illustrated in FIG. 10, similarly to the example illustrated in FIG. 9, near the end of each bifurcating channel of the fluid supply channel 64*in* of each layer, a micro valve 66 for a fluid injection orifice is provided individually, and similarly, near the end of each bifurcating channel of the fluid suction channel 64*out*, a micro valve 67 for a fluid discharge orifice is provided individually. The micro valves 66 and 67 of each layer are operable to perform a valve opening control and a valve closing control, respectively.

The mobile-phone terminal 70 according to the present embodiment possesses structure of the first layer and the second layer, and is able to control to bring into an expansion state the desired dot deformation section 61 among the dot deformation sections 61 arranged in matrix in the each layer, and to bring into an empty (plane) state another desired dot deformation section 61. Accordingly, as illustrated in FIG. 10, in the first layer, a portion of the transparent sheet 62 which is in the expansion state and raised higher than the neighbor dot deformation sections 61, and a portion which is in the empty (plane) state and positioning lower than the neighbor dot deformation section 61 can be formed, and in the second layer, a portion of the transparent sheet 62 which is in the expansion state and raised higher than the neighbor dot deformation section 61, and a portion which is in the empty (plane) state and positioning lower than the neighbor dot deformation section 61 can be formed.

Namely, according to the present embodiment, it is possible to control the expansion state and empty (plane) state of the desired dot deformation section 61 of the first and the second layer. In other words, it is possible to control the height due to the first and the second layer from the display panel surface to at least three levels. This fact means that the flexibility in changing the tactile-visual information which can be conveyed to a user can be raised rather than the example of constitution of FIGS. 7-9, by the tactile-visual UI panel 75 with respect to the direction perpendicular to the screen surface of the display panel 46.

A Specific Example of a Tactile-Visual User Interface by a Mobile-Phone Terminal of the Present Embodiment A specific example of a tactile-visual user interface which can be provided to a user by use of the tactile-visual UI panel of the mobile-phone terminal of each embodiment described above is explained in the following with reference to FIGS. 11-15. FIGS. 11-15 illustrate an example in which deformation control of the deformation section of the tactile-visual UI panel is performed depending on various usage scenes of the mobile-phone terminal of the present embodiment. In FIGS. 11-14, (a) the schematic view of a mobile-phone terminal 100, seen from the display panel screen surface side (the side of a tactile-visual UI panel 101), (b) the schematic view of the mobile-phone terminal 100, seen from the longer side, and (c) the schematic view of the mobile-phone terminal 100, seen from the shorter side, are respectively shown.

Figure 11:
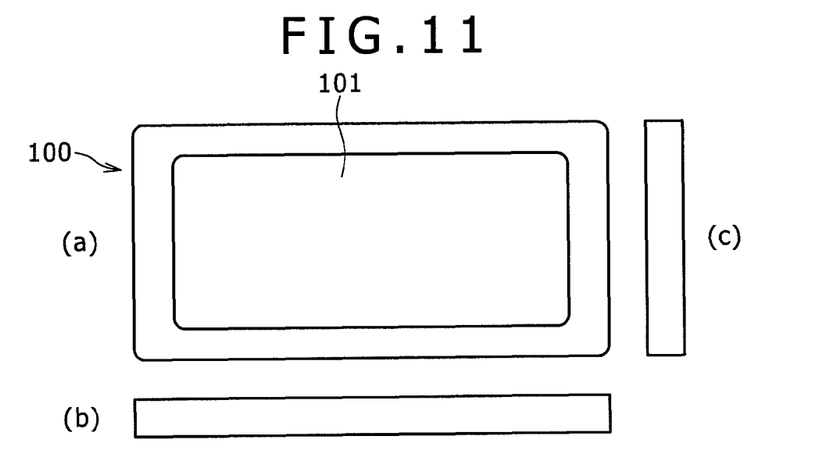
FIG. 11 is an explanatory diagram illustrating a tactile-visual UI panel of a mobile-phone terminal according to an embodiment of the present invention, in a usage scene to display a pre-shooting image and a photograph view image.

FIG. 11 illustrates the mobile-phone terminal 100 in a state in which all the deformation sections of the tactile-visual UI panel 101 is controlled to be flat and not to make unevenness (the dot deformation section is all in a flat state or in an expansion state). FIG. 11 illustrates an example of the user interface in the case where only the visual information is conveyed by displaying an image etc. on the screen of the display panel. As an example of an image displayed on the display panel surface in FIG. 11, a pre-shooting image at the time of photography, a photograph view image at the time of photoed image display, etc. can be listed. That is, FIG. 11 illustrates a scene which displays the pre-shooting image and the photograph view image as the usage scene of the mobile-phone terminal of the present embodiment.

Figure 12:
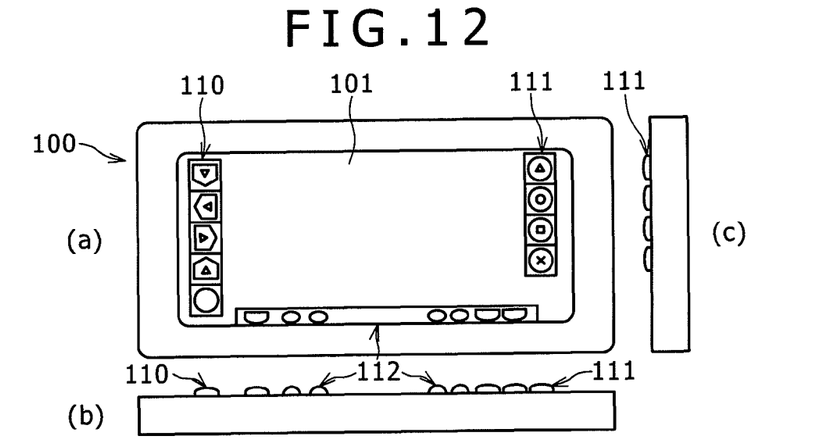
FIG. 12 is an explanatory diagram illustrating a tactile-visual UI panel of a mobile-phone terminal according to an embodiment of the present invention, in a usage scene to perform an electronic game and menu manipulation.

FIG. 12 illustrates the mobile-phone terminal 100 in a state in which a part of the deformation sections 110, 111, 112 of the tactile-visual UI panel 101 are controlled to be in an expansion state and all the other deformation sections are controlled to be in a flat state. FIG. 12 illustrates an example of the user interface in the case where the tactile and visual information communication is enabled by forming convex buttons in plural kinds of shape by the tactile-visual UI panel 101 overlying the display panel surface for example. When the user interface as shown in FIG. 12 is adopted, the mobile-phone terminal 100 of the present embodiment operates the image display control which displays, for example, an image which expresses an engraved mark on a button surface (key top) and shading by light applied on the button concerned from the obliquely upward direction, as an image especially displayed directly below the button which is formed in convex on the tactile-visual UI panel 101 among the display images of the display panel. The user interface of FIG. 12 may correspond to the case where an electronic game is played and the case where menu manipulation is performed as an example. The buttons formed on the tactile-visual UI panel 101 may correspond to a control button, a menu selection button, etc. of the electronic game. In FIG. 12, an image displayed on the display panel surface under the flat face of the tactile-visual UI panel 101 is, for example, a display image of the electronic game at the time when an electronic game is played, and an image of the menu, etc. at the time of menu manipulation. That is, FIG. 12 illustrates the scene of playing an electronic game and performing menu manipulation, as a usage scene of the mobile-phone terminal of the present embodiment.

Figure 13:
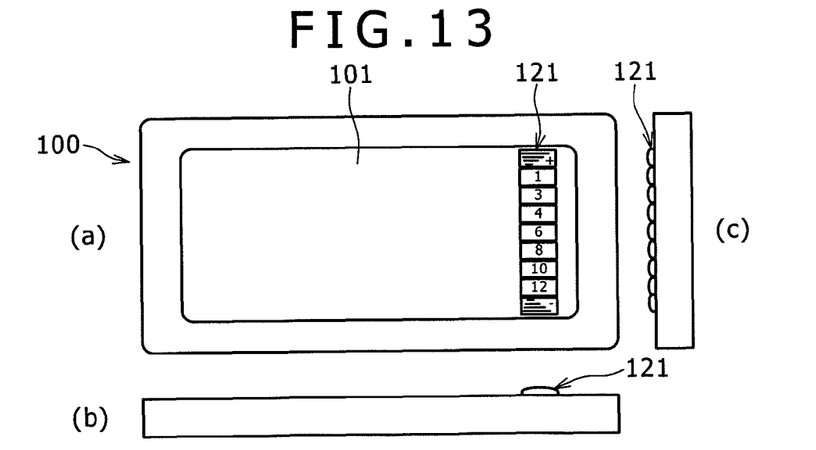
FIG. 13 is an explanatory diagram illustrating a tactile-visual UI panel of a mobile-phone terminal according to an embodiment of the present invention, in a usage scene to perform a TV watching etc.

FIG. 13 illustrates the mobile-phone terminal 100 in a state when a part of a deformation sections 121 of the tactile-visual UI panel 101 is controlled to be in an expansion state, and all the other deformation sections are controlled to be in a flat state. Similarly to the example of FIG. 12, FIG. 13 illustrates an example of the user interface in the case where a tactile and visual information communication is enabled by forming plural convex buttons by the tactile-visual UI panel 101. Also in the user interface as shown in FIG. 13, similarly to the example of FIG. 12, the mobile-phone terminal 100 operates the image display control which displays, for example, an image expressing an engraved mark on a button surface (key top) and shading by light applied on the button concerned from the obliquely upward direction, as an image especially displayed directly below the button which is formed in convex on the tactile-visual UI panel 101 among the display images of the display panel. The user interface shown in FIG. 13 can be applied to watching of digital television broadcasting and reproduction of a recorded video as an example, and the buttons formed by the tactile-visual UI panel 101 can be used as a volume control button, a channel selection button, etc. at the time of the television watching, for example. In FIG. 13, as for the image displayed on the display panel surface under the flat face of the tactile-visual UI panel 101, a television picture is displayed for example. That is, FIG. 13 illustrates the scene of a TV watching, as a usage scene of the mobile-phone terminal of the present embodiment.

Figure 14:
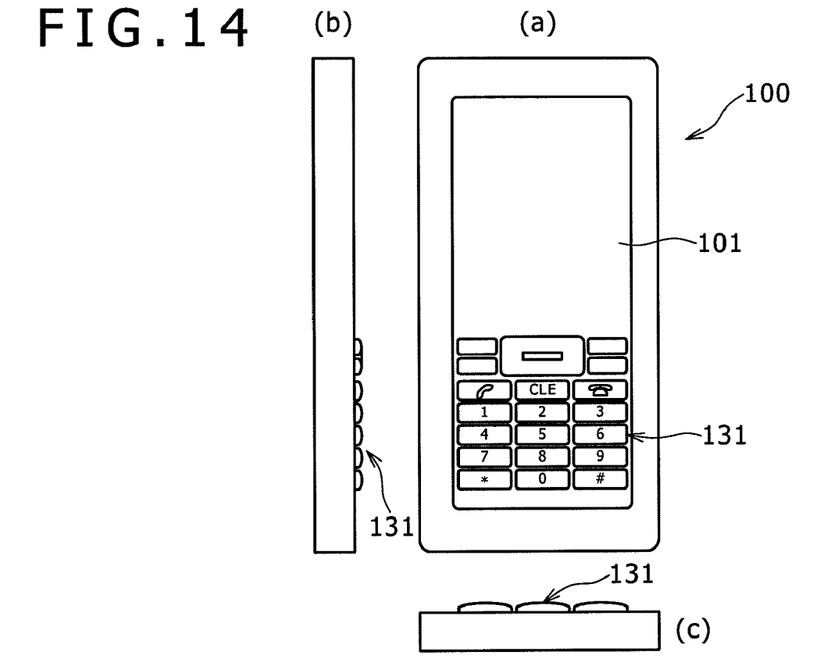
FIG. 14 is an explanatory diagram illustrating a tactile-visual UI panel of a mobile-phone terminal according to an embodiment of the present invention, in a usage scene to be used as a mobile-phone.

FIG. 14 illustrates the mobile-phone terminal 100 in a state when a part of a deformation sections 131 of the tactile-visual UI panel 101 is controlled to be in an expansion state, and all the other deformation sections are controlled to be in a flat state. Similarly to the example of FIG. 12 and FIG. 13, FIG. 14 illustrates an example of the user interface in the case where a tactile and visual information communication is enabled by forming plural convex buttons by the tactile-visual UI panel 101. Also in the user interface as shown in FIG. 14, similarly to the example of FIG. 12 and FIG. 13, the mobile-phone terminal 100 operates the image display control which displays, for example, an image expressing an engraved mark on a button surface (key top) and shading by light applied on the button concerned from the obliquely upward direction, as an image especially displayed directly below the button which is formed in convex on the tactile-visual UI panel 101 among the display images of the display panel. The user interface shown in FIG. 14 can be applied to a mobile-phone use as an example, and the buttons formed by the tactile-visual UI panel 101 can be used as a numeric keypad (a 12-key numeric keypad) of the mobile-phone terminal, a sending and receiving button, an arrow key, etc. In FIG. 14, as for the image displayed on the display panel surface under the flat face of tactile-visual UI panel 101, a default window, a mail creation screen, etc. at the time of mobile-phone use are displayed. That is, FIG. 14 illustrates the scene used as a mobile-phone as a usage scene of the mobile-phone terminal of the present embodiment.

Figure 15:
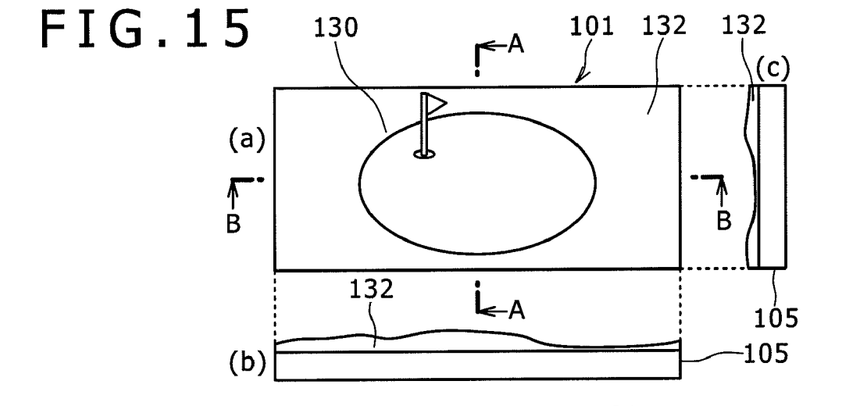
FIG. 15 is an explanatory diagram illustrating a tactile-visual UI panel of a mobile-phone terminal according to an embodiment of the present invention, in a usage scene to express height of an image on a display screen as actual height on the tactile-visual UI panel.

FIG. 15 illustrates an example of the user interface in the mobile-phone terminal 100 in which the flexibility of change in height in the direction perpendicular to the screen surface of the display panel is increased, by employing the tactile-visual UI panel 101 with a multi-layer structure panel device (for example, a several-layer or tens-layer structure panel device) which is especially provided with plural dot deformation sections arranged in matrix as shown in FIG. 10. FIG. 15 illustrates an example in which the user can actually recognize tactilely and visually as a three-dimensional object a three-dimensional image (an image of a three-dimensional space and a solid image in the three-dimensional space) which is virtually displayed on the two-dimensional display screen of a display panel, by the deformation control of the dot deformation section of the tactile-visual UI panel 101.

That is, in FIG. 15, the image of a putting green 130 of a golf course is displayed as an example of the image displayed on the display screen. The display image including the putting green 130 is expressed as a virtual three-dimensional image by employing computer graphics art, although it is a two-dimensional image on the display screen in fact. In the present embodiment, by the deformation control of a dot deformation section 132 of each layer of the tactile-visual UI panel 101, the user can actually recognize, as a visual, tactile, and three-dimensional object, the virtual three-dimensional image expressing the geographical feature in the putting green 130 and the circumference thereof of the golf course concerned (an image in which the surface slope of the putting green 130, the geographical feature of the circumference, etc. are virtually shown in three dimensions). Namely, as the usage scene of the mobile-phone terminal of the present embodiment, FIG. 15 illustrates an example of a scene in which the virtual three-dimensional image displayed on a display screen is expressed tactilely and visually as an actual three-dimensional object on the tactile-visual UI panel. The details of control enabling to express, tactilely and visually, the virtual three-dimensional image on a display screen as a three-dimensional object by the tactile-visual UI panel 101, will be described later.

[Compensation of a Magnified Image Due to Expansion of a Deformation Section of a Tactile-Visual UI Panel]

When the deformation section of the tactile-visual UI panel is deformed to an expansion state to form a convex-shaped button, etc., as in the example of FIGS. 12-14, the convex-shaped button concerned may act as a convex lens. The fact means that the display picture seen through the convex-shaped button will appear more enlarged than the actual size.

Figure 16:
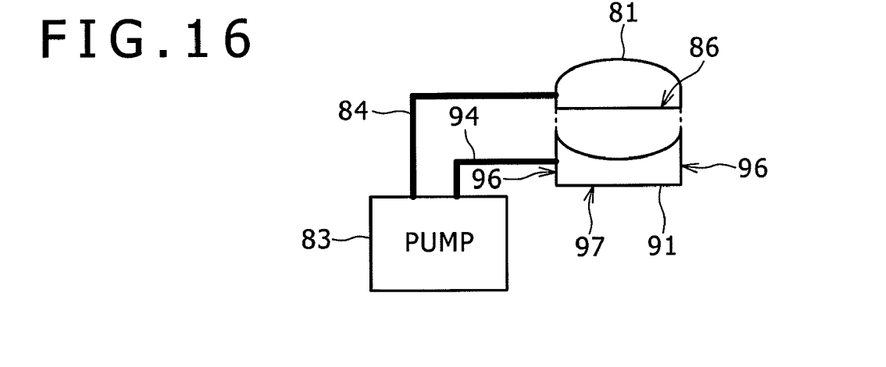
FIG. 16 is an explanatory diagram illustrating one example of constitution for compensating the state where an image is viewed in enlargement due to a convex shape of a deformation section.

FIG. 16 illustrates one example of constitution for compensating the state where an image will appear as enlarged due to the deformation section deformed to a convex shape. FIG. 16 is a mere example of application of the present invention and, of course, does not limit the applicable area of the present invention.

In the exemplified constitution shown in FIG. 16, the tactile-visual UI panel possesses two-layered structure, and a deformation section 81 of the upper layer and a deformation section 91 of the lower layer are arranged around the same axis in the perpendicular direction to the screen surface of a display panel 46. The example of FIG. 16 illustrates only a set of deformation sections of the upper and lower layers among plural deformation sections arranged. The deformation section 81 of the upper layer is formed by the transparent member of which a base part 86 does not possess flexibility, and the deformation section 91 of the lower layer is formed by the transparent member of which a base part 97 and a side part 96 do not possess flexibility. The deformation section 81 of the upper layer is connected to a pump 83 by a fluid channel 84, and the deformation section 91 of the lower layer is connected to the pump 83 by a fluid channel 94.

When the fluid is discharged to the fluid channel 84 in order to bring the deformation section 81 of the upper layer into an expansion state, the pump 83 operates so as to suck the fluid through the fluid channel 94 in order to bring the deformation section 91 of the lower layer into a contracted state, and at the same time, the pump 83 controls to adjust the fluid discharge amount to the deformation section 81 and the fluid suction amount from the deformation section 91, so that the curvature of the portion which deforms to a convex shape due to expansion by injection of the fluid into the deformation section 81 and the curvature of the portion which deforms to a concave shape due to contraction by discharge of the fluid from the deformation section 91 may become same. When the fluid is sucked from the fluid channel 84 in order to bring the deformation section 81 of the upper layer into a flat state, the pump 83 operates so as to discharge the fluid to the fluid channel 94 in order to bring the deformation section 91 of the lower layer into a flat state, and simultaneously, the pump 83 controls to adjust the fluid suction amount from the deformation section 81 and the fluid discharge amount to the deformation section 91, so that both the deformation section 81 and the deformation section 91 may be in a flat state.

Therefore, according to the constitution of FIG. 16, even when the deformation section 81 of the upper layer is deformed to a convex shape, the display image on the display panel may appear to a user at the same size as the actual size.

As another example for compensating the state where an image will appear as enlarged due to the deformation section deformed to a convex shape, the display image of the display panel may be reduced at the reduction ratio corresponding to the magnification ratio of the image due to the deformation section deformed to the convex shape. In this case, the lower layer becomes unnecessary.

[Internal Constitution Overview of a Mobile-Phone Terminal]

Figure 17:
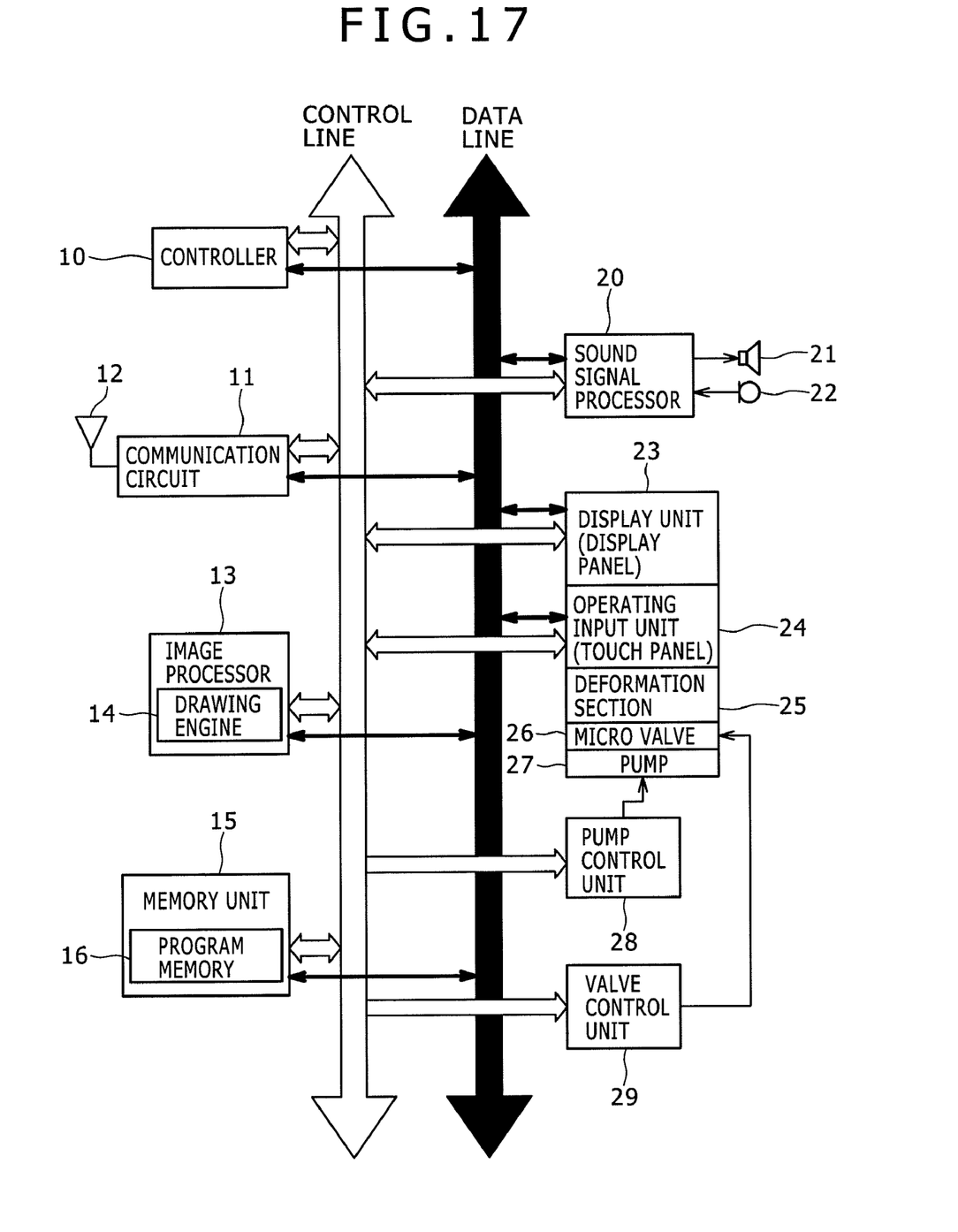
FIG. 17 is a block diagram illustrating an internal constitution overview of the mobile-phone terminal according to the embodiments of the present invention.

FIG. 17 illustrates an internal constitution overview of the mobile-phone terminal according to the embodiments of the present invention.

In FIG. 17, a communication antenna 12 is a built-in antenna, for example, and transmits and receives a signal wave for a telephone call or packet communication. A communication circuit 11 performs frequency conversion, modulation, demodulation, etc. of transmission and reception signals.

A controller 10 possesses a CPU and performs control of communication in the communication circuit 11, signal processing and its control, image processing and its control, control of non-contact communication, and other various signal processing and control of every unit. The controller 10 also performs execution of various kinds of application programs stored in a program memory 16 of a memory unit 15.

A speaker 21 is used for a receiver speaker provided in the mobile-phone terminal, or for an outputting speaker of a ringer tone, an alarm sound, warning beep, a reproduced music, a digital voice, and a voice accompanying a reproduced moving image and the like. The speaker 21 converts the sound signal supplied from a sound signal processor 20 into an acoustic wave, and emits the acoustic wave into the air.

A microphone 22 is used for transmission of a voice and for collecting an external voice. The microphone 22 converts an acoustic wave into a sound signal, and sends the sound signal to the sound signal processor 20.

The sound signal processor 20 performs predetermined sound signal processing, such as decompression/decoding and error correction of the audio data which is processed for compression/encoding and inputted via a data line. The sound signal processor 20 D/A-converts the processed audio data to a sound signal, amplifies the sound signal, and outputs the amplified sound signal to the speaker 21. The sound signal processor 20 amplifies and A/D-converts the input voice signal supplied from the microphone 22, performs compression/encoding and addition of error correcting code, etc., if needed, to the A/D-converted audio data, and outputs the audio data via the data line.

A display unit 23 includes a display device such as a liquid crystal display panel, and a display driving circuit of the display panel, for example. The display unit 23 displays a character, various messages, a static image, a dynamic image, etc. on the screen of the display panel.

An operating input unit 24 corresponds to the transparent touch panel described above in the case of the mobile-phone terminal of the present embodiment. That is, in the operating input unit 24, when a user touches the surface of a transparent touch panel with a fingertip, a stylus pen, etc., for example, the contact is detected and the detection signal is outputted to the controller 10 through the data line or a control line. Accordingly, the controller 10 can recognize which place of the transparent touch panel is touched by the user (the input position is recognized), and can perform processing corresponding to the input position. As an example, in the case of the example of FIGS. 12-14, by recognizing which button is pushed by the user, the function currently assigned to the button can be performed.

A deformation section 25 is the deformation section of the tactile-visual UI panel of the present embodiment described above, a micro valve 26 is the micro valve of the tactile-visual UI panel of the present embodiment, and a pump 27 is the pump described above.

A pump control unit 28 controls operation of fluid discharging and fluid suction in the pump 27 based on the control data from the controller 10. Namely, the control data from the controller 10 includes a control value of fluid discharge amount when the pump control unit 28 controls the fluid discharging operation of the pump 27 and a control value of fluid suction amount when the control unit 28 controls the fluid suction operation of the pump 27. When the tactile-visual UI panel of the mobile-phone terminal of the present embodiment is provided with plural fluid channels, the control data also includes a control value indicating which fluid channel the fluid is to be discharged to or the fluid is to be sucked from.

When the tactile-visual UI panel of the mobile-phone terminal of the present embodiment is provided with plural micro valves, a valve control unit 29 performs a valve opening control and a valve closing control of each micro valve, based on the control data from the controller 10. Namely, the control data from the controller 10 includes a control value to be used by the valve control unit 29 in performing the valve opening control and the valve closing control of each micro valve 26, and also includes a control value for adjusting the amount of valve opening or the amount of valve closing, if the micro valve of the present embodiment is able to adjust the amount of valve opening or the amount of valve closing.

The memory unit 15 includes ROM (Read Only Memory) and RAM (Random Access Memory). ROM includes a rewritable storage medium such as a NAND-type flash memory, and stores for example, in the program memory 16, a program of OS (Operating System), a control program for the controller 10 to control each unit, a control program for controlling the pump and the valve in the present embodiment, and various kinds of application programs. ROM also stores compressed/encoded music data contents or compressed/encoded moving image data contents, various kinds of initial setting values, font data, dictionary data, machine name information, terminal identification information, and the like. RAM stores data as required, serving as a working area at the time of the controller 10 performing various kinds of data processing. A removable external memory cards may be included in the memory unit 15.

An image processor 13 generates image data, such as a standby screen and an E-mail sentence, an address book, various user interface screens, and a reproduced moving image of moving image data contents, and a received moving image of digital television broadcasting. The image processor 13 sends the image data to display on the display panel of the display unit 23 via the data line. The image processor 13 possesses a drawing engine 14, and generates an image data by a rendering process. The image data generated with the drawing engine 14 concerned is also sent and displayed on the display panel of the display unit 23. As mentioned above, processing to display a virtual button image on the display screen and to attach shading to the button image can be also performed by the drawing engine 14. About the rendering process or shading attachment to an image, the existing computer graphics art can be applied; therefore, the detailed explanation thereof is omitted here.

When the tactile-visual UI panel possessing the multi-layer structure of the panel device provided with plural dot deformation sections in matrix arrangement is employed, and when, for example, as illustrated in FIG. 15, the three-dimensional image virtually expressed by the two-dimensional display image of the display screen is made recognizable by a user as a visual, tactile, and three-dimensional object by the deformation control of the dot deformation section of the tactile-visual UI panel, the following processing is performed in the image processor 13 and the controller 10 of the mobile-phone terminal of the present embodiment. The processing explained below is a mere example of application of the present invention and, of course, does not limit the applicable area of the present invention.

By the rendering process in the drawing engine 14, the image processor 13 of the mobile-phone terminal of the present embodiment generates the image data for performing the two-dimensional display of the virtual three-dimensional image as indicated in FIG. 15 on the display panel, and sends the image data to the display unit 23. At this time, the image processor 13 sends, to the controller 10, a three-dimensional graphics data including the coordinates of the X, Y, Z-axis which are employed in the rendering process in the drawing engine 14.

Using the three-dimensional graphics data, the controller 10 calculates the height in the virtual three-dimensional space concerned for every polygon drawn by the computer graphics technology. The controller 10 sets up a split screen area which splits the display screen into matrices, and collects the height information in the virtual three-dimensional space of each polygon which constitutes the images to be displayed in each split screen area (the images that the three-dimensional image is divided for every split screen area), so as to correspond to each dot deformation section arranged in matrix on the tactile-visual UI panel. The controller 10 sets up the information possessing the highest value among the height information of the polygon in the split screen area concerned as the height information of the virtual three-dimensional image in the split screen area. The controller 10 generates the height information with respect to the perpendicular direction to the display panel screen surface from the height information of the virtual three-dimensional image in each split screen area, and generates the control data to respectively perform deformation control for each dot deformation section arranged in matrix in the tactile-visual UI panel, from the height information with respect to the perpendicular direction to the display panel screen surface concerned.

To give the explanation more concretely, the controller 10 generates a control data which brings to an empty (plane) state the whole dot deformation sections of each layer in the tactile-visual UI panel, at the position corresponding to the split screen area which possesses the image exhibiting the lowest height in the virtual three-dimensional space among the virtual three-dimensional image in the split screen area. The controller 10 also generates a control data which brings to an expansion state the whole dot deformation sections of each layer in the tactile-visual UI panel at the position corresponding to the split screen area which possesses the image exhibiting the highest height in the virtual three-dimensional space among the virtual three-dimensional image in the split screen area. As for the other dot deformation sections of each layer in the tactile-visual UI panel at the position corresponding to the remaining split screen area excluding the split screen area which possesses the image exhibiting the highest height in the virtual three-dimensional space and the split screen area which possesses the image exhibiting the lowest height in the virtual three-dimensional space among the virtual three-dimensional image in the split screen area, the controller 10 generates a control data which brings to an expansion or an empty (plane) state the dot deformation section of each layer in the tactile-visual UI panel at the position corresponding to the split screen area concerned, corresponding to the height of the virtual three-dimensional image in the split screen area. The controller 10 controls the pump control unit 28 and the valve control unit 29 by the control data generated above. Accordingly, as explained in FIG. 15, the virtual three-dimensional image displayed on the display screen will be expressed as an actual three-dimensional object on the tactile-visual UI panel.

In addition, although the illustration is omitted in FIG. 17, the mobile-phone terminal according to one embodiment of the present invention possesses components which are provided in a common mobile-phone terminal, such as: a digital camera unit for shooting a photographic image; LEDs (light emitting diodes) and the driver for a key lighting, an incoming alert lamp, etc.; a battery for supplying power to each unit and a power management IC unit to control the power; a short distance radio communication unit for performing short distance radio communication by the so-called Bluetooth method (registered trademark) and the UWB (Ultra Wide Band) method, a wireless LAN (Local Area Network), etc.; a GPS (Global Positioning System) communication unit; a slot for external memory; a receiving tuner of digital broadcasting and an AV codec unit; a timer (clock unit); and the like.

SUMMARY

As explained above, in the mobile-phone terminal according to an embodiment of the present invention, it is possible to realize a user interface which can convey information in a tactile and visual mode to a user, by performing the deformation control of a tactile-visual UI panel, and especially it is possible to realize a user interface which can change the information conveyed in a tactile mode as well as the information conveyed in a visual mode, by forming the tactile-visual UI panel in multi-layer structure, and performing deformation control for every layer.

In the mobile-phone terminal of the present embodiment, ultimate thinness of the mobile-phone terminal is realizable, because any mechanically-structured button or key is not included.

Explanation of the embodiments of the present invention described above is an example of the present invention. Therefore, the present invention is not limited to the embodiments described above, and various modifications and alterations may be possible depending on design requirements and other factors insofar as they do not deviate from the technical idea concerning the present invention.

The user interface device and the personal digital assistant according to an embodiment of the present invention can be applied not only to a mobile-phone terminal, but to PDA (Personal Digital Assistant) and a personal computer, a portable video game device, a portable digital television receiver, a car navigation system, other various terminals, and in addition, to a stationary apparatus.

In the embodiment described above, the example in which a transparent touch panel is provided over the upper surface of the tactile-visual UI panel is illustrated. One example of the transparent touch panel is a touch panel of the so-called capacitance detection system. Of course, the present invention is not limited to the example. The present invention is applicable to, for example, a touch panel of the method which detects change of resistance by depression pressure such as the so-called resistance wire type, an optical type touch panel which detects a light interrupted with a finger etc. or a light reflected with a finger, etc., a magnetic induction type touch panel which detects change of magnetism using a dedicated pen such as a stylus pen, and other touch panels. The transparent touch panel may be provided between the display panel and the tactile-visual UI panel, i.e., the underface side of the tactile-visual UI panel. When the transparent touch panel is especially provided in the underface side of a tactile-visual UI panel, it becomes unnecessary for the transparent touch panel concerned to possess flexibility as needed in the above-described embodiment. When the transparent touch panel of the method which can detect the external pressure applied with a finger etc. is employed, the pressure variation by expansion, etc. of the deformation section of the tactile-visual UI panel may be accidentally detected as if the external pressure with a finger etc. were applied. However, in such a case, it may be possible, as an example, to judge the difference between the pressure value by expansion of the deformation section and the pressure value by external pressure with a finger etc. and to avoid the misjudgment to accidentally detect the pressure value by the expansion of the deformation section as the external pressure with the finger etc.

In addition, the user interface device of the present embodiment may be formed not only in a compact apparatus such as a personal digital assistant, but also with a large-sized display or screen and a user interface panel (UI panel) arranged over the upper surface of the large-sized display or screen. The large-sized display or screen includes, for example, a super-large screen display panel arranged on the roof of a building, on an outer wall surface, or on an indoor inner wall surface, a large screen of a stadium, and a large screen display panel arranged on the ground of recreation facilities etc. In the case of the large-sized user interface device provided with such a large screen display panel of size of from tens of inches to hundreds of inches or beyond, the concavo-convex part formed by the deformation section of the UI panel may possess a width in scale of from several centimeters to several meters, for example, and a height in scale of from several centimeters to several meters. It is desirable to set the hardness of the deformation section to a desired degree of hardness, corresponding to the size of the user interface device concerned.

It should be understood by those skilled in the art that various modifications, combinations, sub-combinations and alterations may occur depending on design requirements and other factors insofar as they are within the scope of the appended claims or the equivalents thereof.

What is claimed is:

1. A user interface device comprising:
 a transparent panel unit including a plurality of layers, each of the layers being provided with a plurality of transparent deformation sections operable to be deformed to a specified shape by one of injection of fluid and discharge of fluid;
 a fluid channel unit possessing one of structure forming a first channel and a second channel in common and structure forming the first channel and the second channel separately, the first channel being a transparent fluid channel operable to supply fluid to be injected to the deformation sections and the second channel being a transparent fluid channel operable to pass fluid discharged from the deformation sections;
 a fluid pump unit operable to perform one of discharge of fluid at least to the fluid channel unit and suction of fluid at least from the fluid channel unit;
 a display panel unit including the transparent panel unit provided over an upper surface of the display panel unit and a screen surface operable to display at least an image; and
 a controller operable to control one of injection of the fluid to the deformation sections of the transparent panel unit and discharge of the fluid from the deformation sections of the transparent panel unit, according to an image to be displayed on the screen surface of the display panel unit, wherein the deformation sections provided in each of the layers of the transparent panel unit are operable to be deformed to a differently specified shape for at least each of the layers such that the differently specified shapes are combinable into a plurality of which is related to a respective image displayed on the display screen.

2. The user interface device of claim 1, further comprising:
a touch detection panel unit arranged in one of an upper surface side and a lower surface side of the transparent panel unit and operable to detect a touch position of an object to generate a detection signal.

3. The user interface device of claim 1, wherein the deformation sections provided in each of the layers of the transparent panel unit are arranged in matrix in each of the layers.

4. The user interface device of claim 1, further comprising:
a valve unit operable to limit one of injection of the fluid to each of the deformation sections and discharge of the fluid from each of the deformation sections.

5. The user interface device of claim 1,
wherein the controller is operable to generate information on height in a perpendicular direction from a screen surface of the display panel unit at each specified position of the screen surface of the display panel unit, based on an image in a three-dimensional space virtually displayed on a two-dimensional display screen of the display panel unit, and
wherein the controller is operable to control one of injection of the fluid to the deformation sections and discharge of the fluid from the deformation sections, based on the information on height in the perpendicular direction at each specified position of the screen surface of the display panel unit.

6. A personal digital assistance comprising:
a display panel unit possessing a display screen operable to display at least an image;
a transparent panel unit provided over an upper surface of the display screen of the display panel unit and including a plurality of layers, each of the layers being provided with a plurality of transparent deformation sections operable to be deformed to a specified shape by one of injection of fluid and discharge of fluid;
a fluid channel unit possessing one of structure forming a first channel and a second channel in common and structure forming the first channel and the second channel separately, the first channel being a transparent fluid channel operable to supply fluid to be injected to the deformation sections and the second channel being a transparent fluid channel operable to pass fluid discharged from the deformation sections;
a fluid pump unit operable to perform one of discharge of fluid at least to the fluid, channel unit and suction of fluid at least from the fluid channel unit; and
a controller operable to control one of injection of the fluid to the deformation sections of the transparent panel unit and discharge of the fluid from the deformation sections of the transparent panel unit, according to an image to be displayed on the screen surface of the display panel unit,
wherein the deformation sections provided in each of the layers of the transparent panel unit are operable to be deformed to a differently specified shape for at least each of the layers such that the differently specified shapes are combinable into a plurality of shapes each of which is related to a respective image displayed on the display screen.

* * * * *